April 11, 1944. E. C. GULESIAN 2,346,298
TIRE CHAIN
Filed Aug. 30, 1941 2 Sheets-Sheet 1

Inventor
Ephraim S. Gulesian
by
Spear Rawlings & Spear
Attorneys

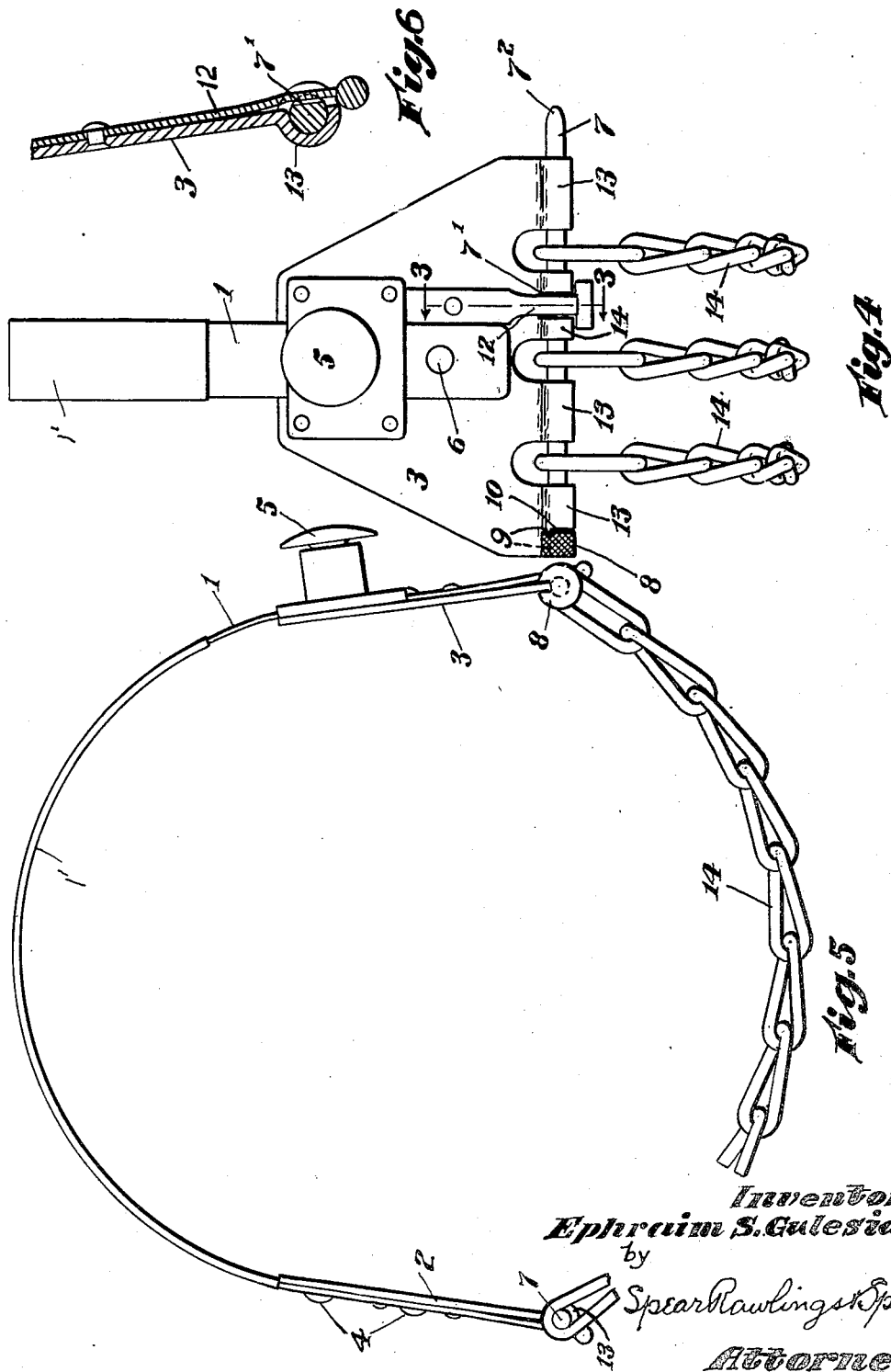

Patented Apr. 11, 1944

2,346,298

UNITED STATES PATENT OFFICE 2,346,298

TIRE CHAIN

Ephraim C. Gulesian, Boston, Mass.

Application August 30, 1941, Serial No. 408,923

3 Claims. (Cl. 152—237)

This invention relates to improvements in tire chains and to a novel method of their use and application.

So-called jiffy or emergency chains have been suggested in many patents but seem to have attained no general use.

My experience and experimental research, if long experience in such so may be termed, have led me to a basis of concept-analysis which I believe to be new. In practical use my chains are consistently reliable and may be depended upon for emergency ditch work, or worn even on hard road surfaces without annoyance.

One answer seems to lie in my simple but efficient system of the triple gang cross chain. This has been suggested pictorially but not in a form adapted to mechanical use.

As illustrative of my invention I have shown in the accompanying drawings, in which like characters of reference conventionally denote the corresponding parts, a partly schematic partly mechanical depiction.

In the drawings:

Fig. 4 is a side view of a heavy duty equipment for such an installation and use.

Fig. 5 is an end view of such a gang chain, and Fig. 6 is a fragmentary view showing in section the pintle lock.

Like many of the indicated emergency equipments I attach my chain systems by an interspoke bond but do so without rigidity or tension, thus permitting my chain systems, not so much to creep, as to re-adjust.

Figure 1:
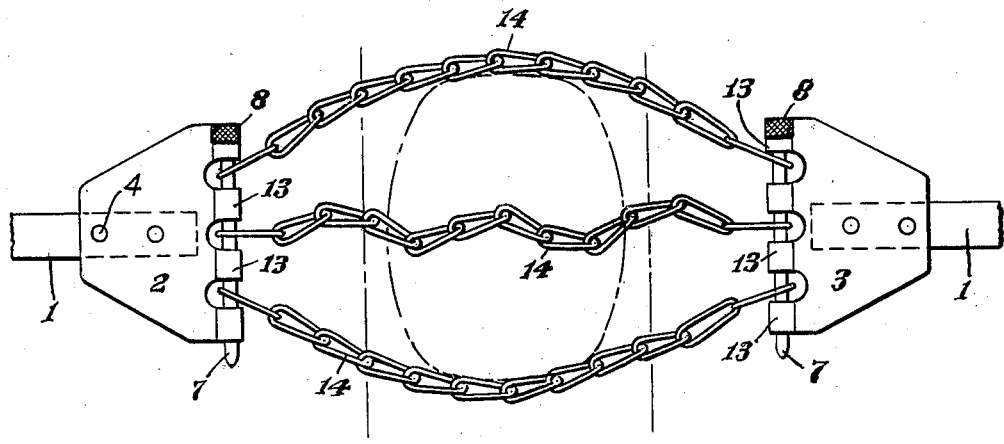
Fig. 1 is an indicated ground projection of a tire tread at rest with my chain system applied.

Therein, as I have attempted to indicate in Fig. 1 my method is unlike previously proposed emergency relief systems.

As early anticipated a narrow strap 1 is preferably employed as the basis of mounting and according to current slotted wheel design such a thin narrow strap becomes important. Especially according to my invention I make my so-called strap of thin sheet steel whereby to assist in penetration of a wheel slot even though clogged with mud or caked with tar and sand.

From such an anchorage I suspend at opposite sides of a tire T a pair of spreaders 2 and 3 after the manner of a beam trawl. These spreaders are also suggested in the prior art, as in Letters Patent to Trainer et al., No. 1,536,362, filed in 1923, but without tension as therein indicated, as a tensioned cross-chain cannot re-adjust as was proven in Weed Chain Grip Company vs. Atlas Chain Company, 194 Fed. 448.

I preferably make my spreader 2 as a relatively fixed member which may be attached as by rivets 4 to the strap 1. On the other end of the strap 1 and correspondingly on the other side of the tire when in place, as in Fig. 5, the spreader member 3 is given a slight adjustability on the strap 1. This I have conveniently provided as a resilient detent 5 for taking in one or more of a series of apertures 6 corresponding to the old buckle and strap holes heretofore used on units of this type.

My spreaders 2 and 3 are preferably formed of sheet metal stamping with spaced marginal, hinge-like loops 13 slidably to receive a pintle or cross-chain retainer 7. This pintle 7 is provided with a head 8 notched as at 9 resistantly to engage, as by a key, the adjacent edge of the adjacent loop edge 10 of a loop 13 to prevent rotation. The pintle 7 is detachably or removably held in sliding relation to the spaced loops 13 as it is notched as at 7' to receive the lip of a resilient detent such as the leaf spring 12. It is provided at its entering end 7² with a slight conic portion or taper to assist penetration.

The pintles 7 are threaded through the terminal links of a gang of cross chains 14. These are provided in assorted lengths to suit the size or oversize of tires so that complicated adjustment of the strap 1 is not necessary.

Figure 2:
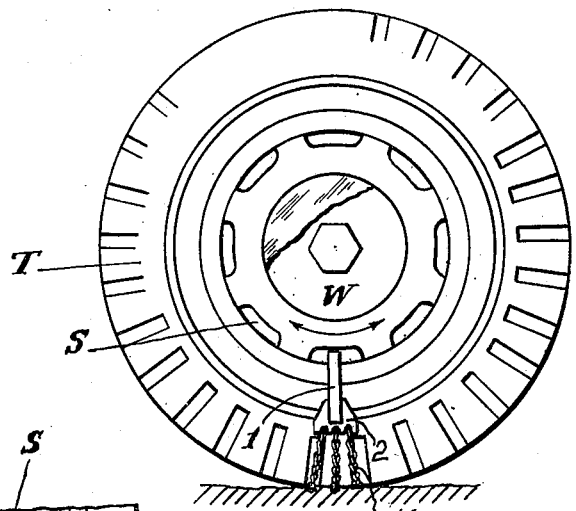
Fig. 2 is a side elevation of a wheel and tire indicated as at rest and with a set of my triple gang cross chains mounted for emergency or other service.
Figure 3:
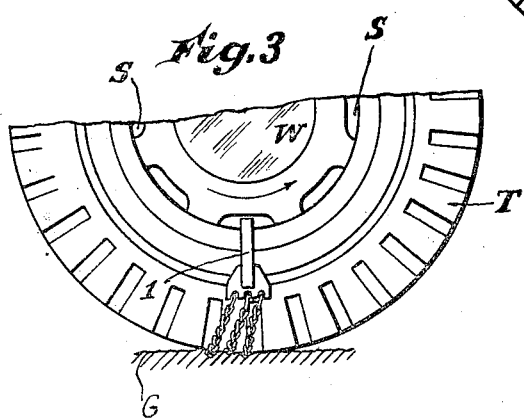
Fig. 3 is a fragmentary view of a similar installation on a tire indicated as at the pick-up step of the method of use.

Supported as indicated the terminal links have a slight play on the pintle between the loops 13. This permits peripheral adjustment of the cross chain members 14 when the tire T is at rest and settles to surface contact with a road or other surface G as in Figs. 2 and 3. It also facilitates readjustment under centrifugal urge as in Fig. 3.

In use according to my method the cross chains 14 may assume the posture as in Fig. 1 either when standing on a surface G or when "drawn in" as in emergency in a mud hole or soft shoulder where the cross chains must "find" the curvature of the tire. At such point the slight ability to spread to adjust circumferentially becomes important. My emergency chain gangs 14 may be drawn in without jacking up or with a minimum lift. The straps 1 find or re-open their slots S, if present in the wheel W, adjacent its tire channel or between spokes as the case may be.

The foregoing will indicate the importance of my inventions to those needfully minded, in emergencies. However, my cross chains are so silent and non-bumpy that they can be driven on hard surface pavements without offense to driver or damage to the pavement surface.

By reversal of cross-chain elements a double wear is made available and for cross-chain replacements the spring held pintle 7 permits easy repair without tools. The stiff strap 1 is conveniently important in an emergency and especially on the new current wheel design, with a narrow peripheral slot as at S.

However, the strap is optional except as claimed. The number of cross-chains is indicated as a triplet as it conforms suitably to my method of emergency extraction, but any number, as indicated in the prior art may be used, if disposed according to my method of use. Such modifications and variant uses will be apparent to all who are familiar or must become so in this art and may be provided to meet changing modes in car design.

What I therefore claim and desire to secure by Letters Patent is:

1. A tire chain for attachment to an automobile or the like wheel comprising a plurality of cross chains, a pair of spreaders, each of said spreaders having one edge formed with a plurality of portions having alined apertures and with recesses intermediate said portions to accommodate the end links of said cross chains thereby to maintain said cross chains in spaced relation, a pintle to enter the alined apertures of each of said spreaders and the end links of said cross chains, means carried by each spreader to hold said pintles against axial movement, and means to detachably interconnect said spreaders and attach said chain to the wheel.

2. The tire chain of claim 1 in which the means detachably interconnecting the spreaders comprise a relatively stiff strap member secured at one end to one of the spreaders and having apertures in its other end, a member carried by the other spreader to define therewith a passage for the end of the strap member, and locking means carried by the last-named member to enter one of the apertures.

3. The tire chain of claim 1 in which the pintle locking means comprise a resilient member carried by each spreader for engagement with the pintle, the pintle being formed with a recess to receive the resilient member.

EPHRAIM C. GULESIAN.